United States Patent
Sun

(10) Patent No.: US 8,767,386 B2
(45) Date of Patent: Jul. 1, 2014

(54) FASTENING DEVICE FOR HARD DISK DRIVE

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 161 days.

(21) Appl. No.: 13/474,727

(22) Filed: May 18, 2012

(65) Prior Publication Data

US 2013/0271912 A1    Oct. 17, 2013

(30) Foreign Application Priority Data

Apr. 17, 2012    (CN) .......................... 2012 1 0112524

(51) Int. Cl.
*G06F 1/16*    (2006.01)
(52) U.S. Cl.
CPC ........................................ *G06F 1/16* (2013.01)
USPC ................ 361/679.39; 248/316.7; 360/99.08; 165/104.33
(58) Field of Classification Search
CPC ....................................................... G06F 1/16
USPC ............. 312/223.1, 223.2, 249.11, 326, 219, 312/265.1, 257.1, 265.5; 165/80.2, 121, 165/104.33; 361/679.33, 679.39, 679.08, 361/679.21, 679.36, 679.34, 679.55, 361/679.09, 679.48, 679.35, 679.49, 361/679.31, 679.02, 679.38, 679.3, 679.47, 361/679.58, 679.37, 679.26; 248/221.11, 248/310, 309.1, 636, 316.7, 122.1, 316.1, 248/560; 360/97.12, 235.4, 97.17, 99.08, 360/266.5, 97.13, 97.18
See application file for complete search history.

(56) References Cited

U.S. PATENT DOCUMENTS

2013/0233987 A1*    9/2013 Sun ........................... 248/221.11
2013/0271911 A1*   10/2013 Sun ........................... 361/679.33

* cited by examiner

*Primary Examiner* — Hung Duong
(74) *Attorney, Agent, or Firm* — Novak Druce Connolly Bove + Quigg LLP

(57) ABSTRACT

A fastening device for a hard disk drive (HDD) includes a bottom plate and two fastening members. Two protrusions protrude up from the bottom plate. A positioning portion is formed on the bottom plate. The positioning portion defines a hooking slot. Each fastening member includes a connection wall, and a top wall and a bottom wall perpendicularly extending from top and bottom sides of the connection wall. The top walls are fastened to a bottom of the HDD. Each bottom wall defines an engaging hole. The engaging hole includes a large first hole and two small second holes communicating with opposite sides of the first hole. A latch is formed on one of the fastening members. The HDD is operable to slide to allow the protrusions to enter the corresponding second holes from the corresponding first holes, and to allow the latch to engage in the hooking slot.

12 Claims, 6 Drawing Sheets

FASTENING DEVICE FOR HARD DISK DRIVE

CROSS-REFERENCE TO RELATED APPLICATION

Relevant subject matter is disclosed in a pending U.S. patent application, titled "FASTENING DEVICE FOR HARD DISK DRIVE", filed on May 17, 2012, with the application Ser. No. 13/473,630, which is assigned to the same assignee as this patent application.

BACKGROUND

1. Technical Field

The present disclosure relates to a device for fastening a hard disk drive (HDD).

2. Description of Related Art

Many HDDs are screwed to the brackets in computers, such that the HDDs are rigidly connected to the chassis of the computers, which means any vibrations or shocks to the chassis are easily transferred to the HDDs. When an HDD is operating at a high speed, such vibrations may harm the HDD.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
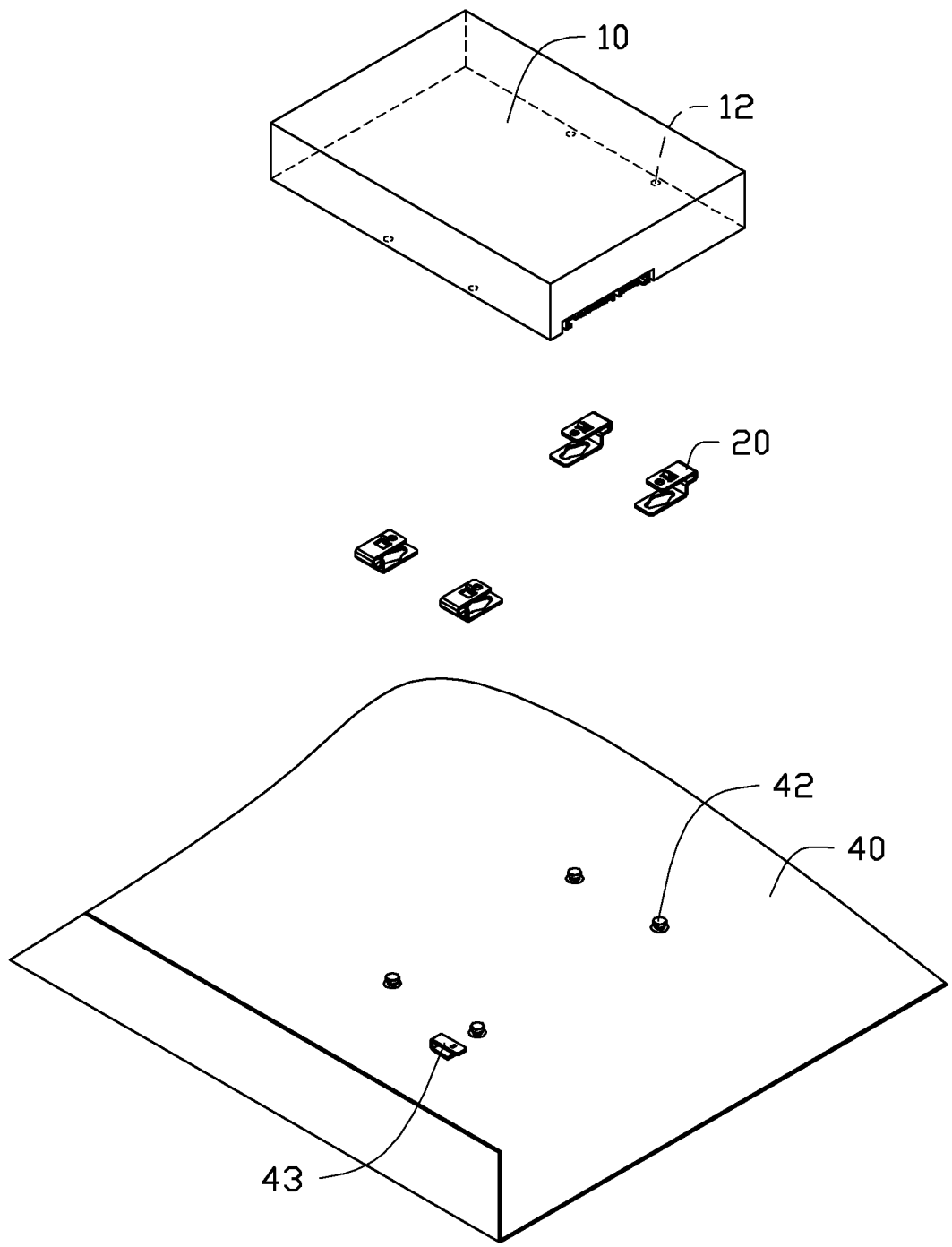
FIG. 1 is an exploded, isometric view of an exemplary embodiment of a fastening device together with a hard disk drive (HDD), wherein the fastening device includes four fastening members.

FIG. 1 shows an exemplary embodiment of a fastening device for a hard disk drive (HDD) 10. Four mounting holes 12 are defined in a bottom of the HDD 10, adjacent to opposite sides of the HDD 10 respectively. The fastening device includes a bottom plate 40 and four fastening members 20.

Figure 2:
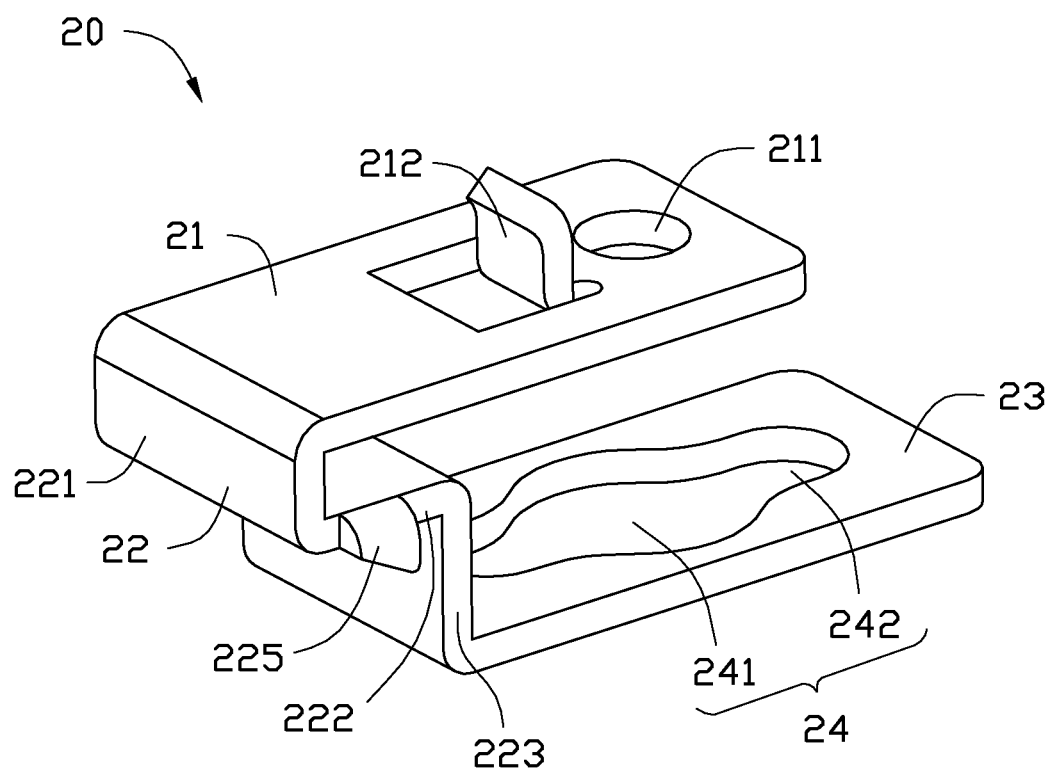
FIG. 2 is an enlarge view of one of the fastening members of FIG. 1.
Figure 3:
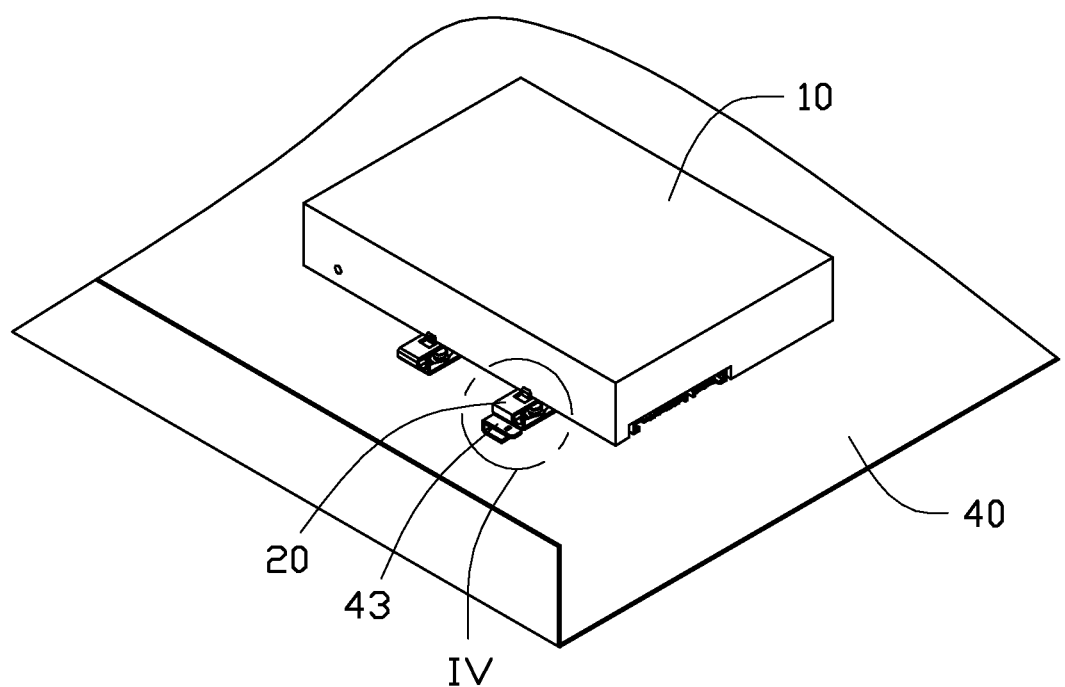
FIG. 3 is an assembled, isometric view of FIG. 1.

FIG. 2 shows each fastening member 20 including a top wall 21, a bottom wall 23 parallel to the top wall 21, and a connection wall 22 connected between first ends of the top wall 21 and bottom wall 23. A through hole 211 is defined in the top wall 21, away from the connection wall 22. A stopping tab 212 extends up from the top wall 21 in a substantially perpendicular manner, between the first end of the top wall 21 and the through hole 211. An engaging hole 24 is longitudinally defined in the bottom wall 23. The engaging hole 24 includes a first hole 241, and two second holes 242 communicating with the first hole 241 at opposite sides of the first hole 241. The first hole 241 has a larger diameter than the second holes 242. The connection wall 22 includes a first wall 221 perpendicularly extending down from the first end of the top wall 21, a second wall 222 perpendicularly extending from a bottom side of the first wall 221 toward the through hole 211, and a third wall 223 perpendicularly extending down from a side of the second wall 222 away from the first wall 221 to be connected to the first end of the bottom wall 23. A latch 225 is formed on an end surface of the second wall 222, extending below the second wall 222.

Figure 4:
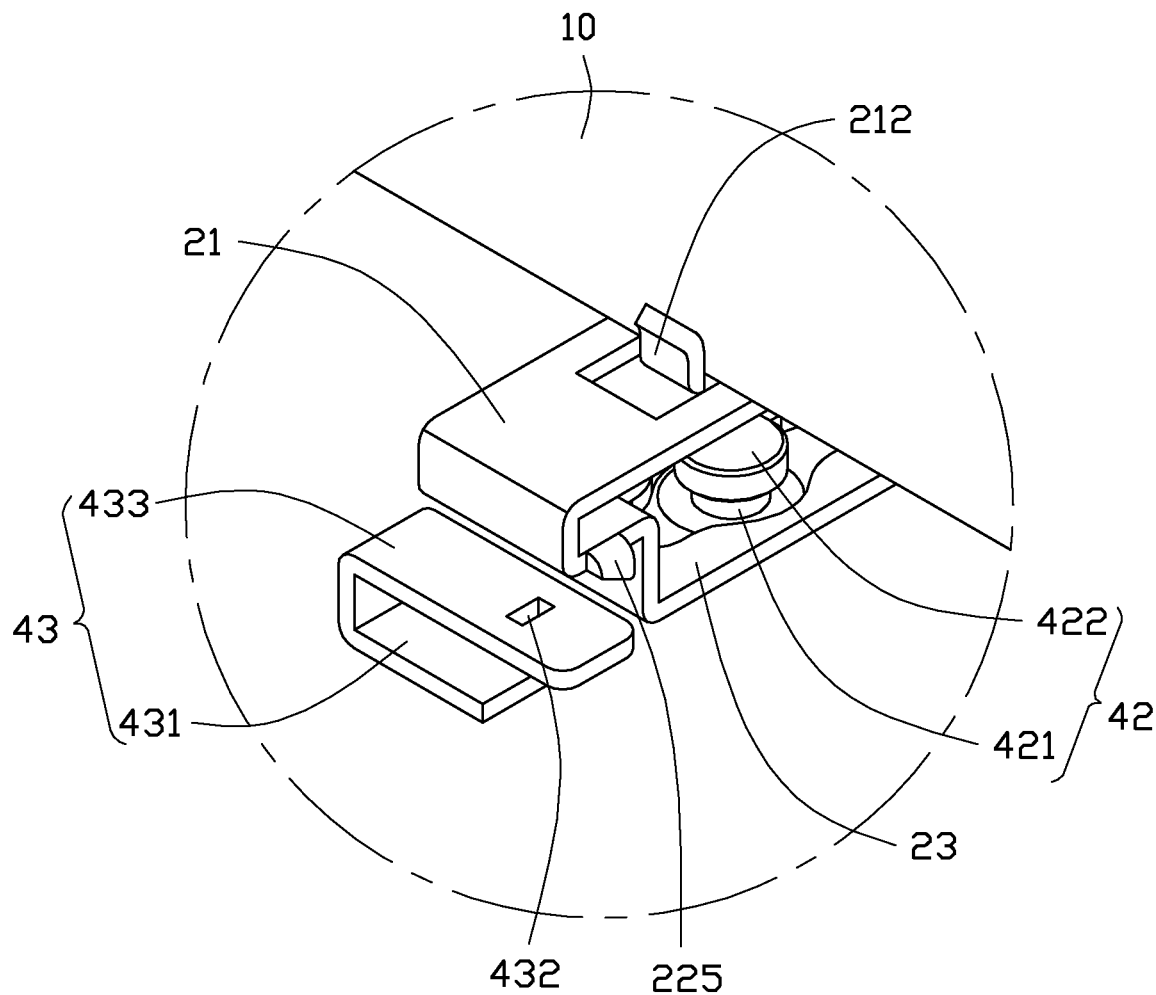
FIG. 4 is an enlarged view of a circled portion IV of FIG. 3.
Figure 5:
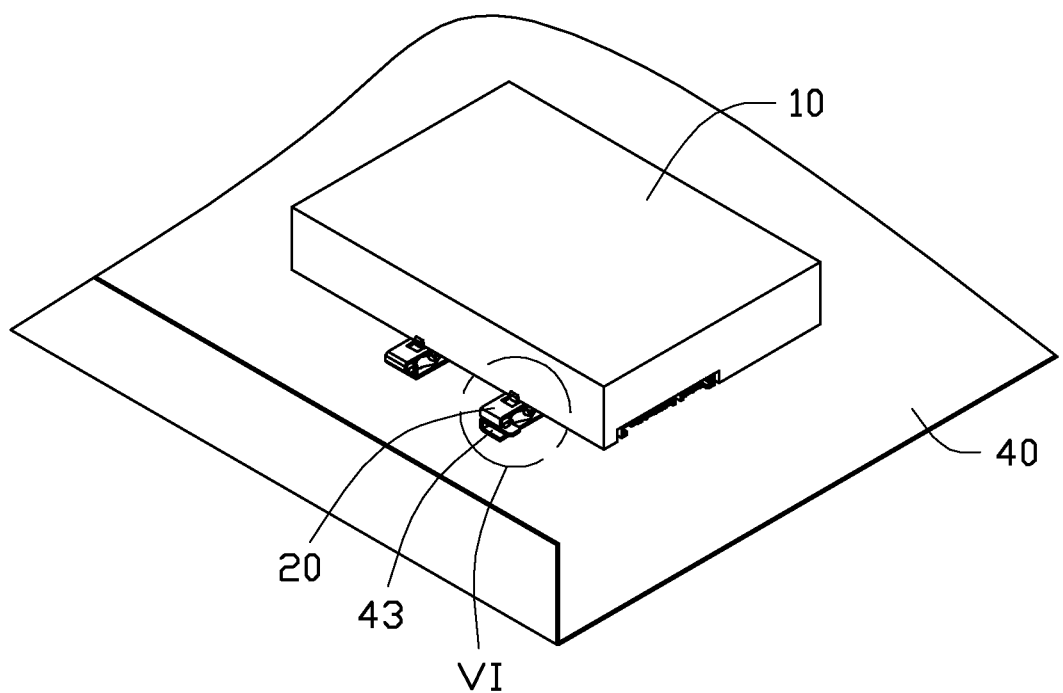
FIG. 5 is similar to FIG. 3, but shows a different state.
Figure 6:
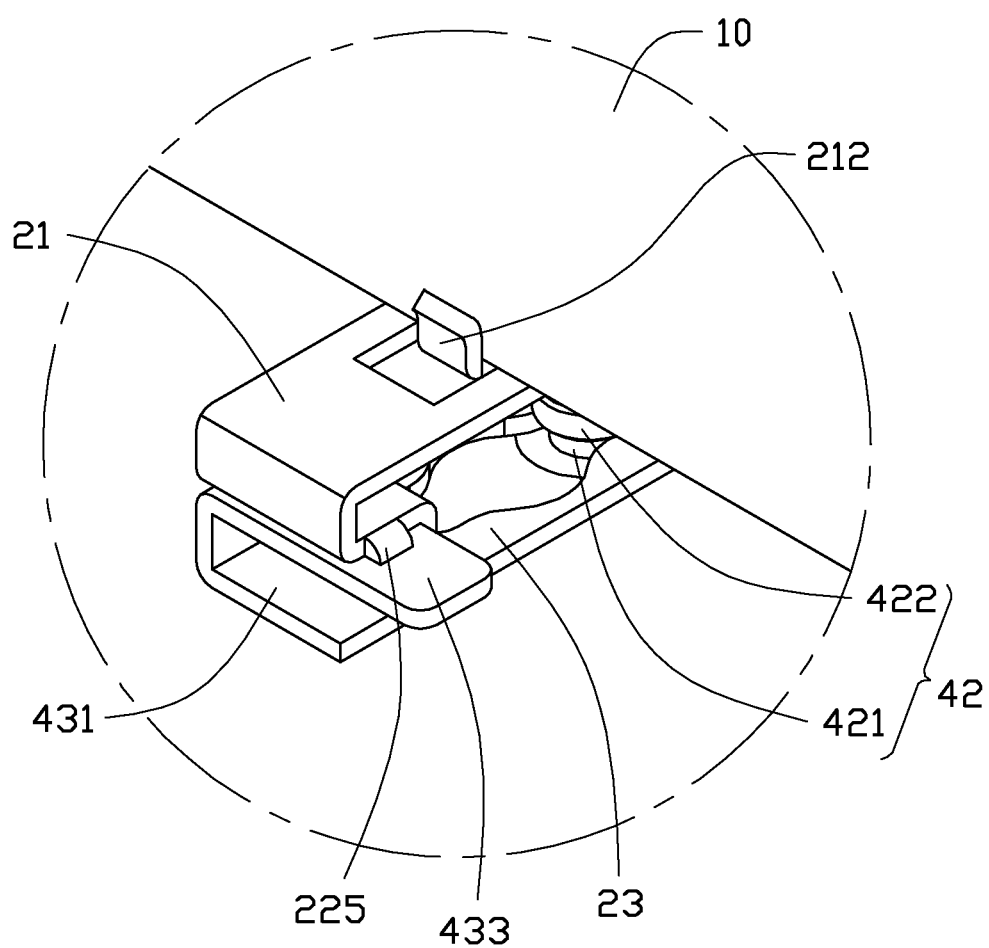
FIG. 6 is an enlarged view of a circled portion VI of FIG. 5.

FIGS. 1 and 4 show four protrusions 42 protruding up from the bottom plate 40. The protrusions 42 form the four corners of a rectangle. Each protrusion 42 includes a neck 421 extending up from the bottom plate 40 and a head 422 formed on a top end of the neck 421. The head 422 has a larger diameter than the neck 421. A substantially U-shaped positioning portion 43 is formed on the bottom plate 40, beside one of the protrusions 42. The positioning portion 43 includes an L-shaped fastening tab 431 fastened to the bottom plate 40, and a positioning tab 433 extending from a top of the fastening tab 431, parallel to the bottom plate 40. A hooking slot 432 is defined in the positioning tab 433.

FIGS. 3-6 show in assembly, the top walls 21 are placed on the bottom of the HDD 10. The through holes 211 are aligned with the corresponding mounting holes 12. The stopping tabs 212 block opposite sides of the HDD 10. Four screws extend through the corresponding through holes 211, and engage in the corresponding mounting holes 12. Therefore, the fastening members 20 are fastened to the bottom of the HDD 10.

The HDD 10 together with the fastening members 20 is placed above the bottom plate 40. The first holes 241 align with the corresponding protrusions 42. The HDD 10 is manipulated downward, to make the protrusions 42 extend through the corresponding first holes 241. The bottom walls 23 abut against the bottom plate 40. The HDD 10 is slid toward the positioning portion 43 on the bottom plate 40. The necks 421 move to engage in the corresponding second holes 242, and the heads 422 abut against the corresponding bottom walls 23. The latch 225 of the fastening member 20 near the positioning portion 43 is deformed upwards after abutting against the positioning tab 433. When the latch 225 aligns with the hooking slot 432, the latch 225 is restored to engage in the hooking slot 432. Therefore, the HDD 10 is fastened to the bottom plate 40.

The HDD 10 is fastened to the bottom plate 40 by the fastening members 20. A certain distance exists between the bottom plate 40 and the HDD 10. When the fastening members 20 are subjected to vibrations or shocks, the fastening members 20 can be deformed to absorb at least part of vibration energy.

In other embodiments, the latches 225 of the fastening members 20 which are not mounted to the positioning portion 43 are omitted.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A fastening device for a hard disk drive (HDD), comprising:
   a bottom plate, two protrusions protruding up from the bottom plate, a positioning portion formed on the bottom plate, the positioning portion defining a hooking slot; and
   two fastening members each comprising a connection wall, and a top wall and a bottom wall perpendicularly extending from top and bottom sides of the connection wall, the top walls to be fastened to a bottom of the HDD, each bottom wall defining an engaging hole, the engaging hole comprising a first hole and two second holes communicating with the first hole at opposite sides of the first hole, the first hole having a larger diameter than the second holes, a latch formed on one of the fastening members,
   wherein when the HDD is being fastened by the fastening device, the HDD is slid to allow each protrusion to enter one of the second holes from a corresponding one of the first holes, and to allow the latch to engage in the hooking slot.

2. The fastening device of claim 1, wherein each protrusion comprises a neck extending up from the bottom plate and a head formed on a top of the neck, the head has a larger diameter than the neck, the neck engages in the corresponding second hole after entering the second hole, the head abuts against the corresponding bottom wall.

3. The fastening device of claim 1, wherein two stopping tabs extend up from the corresponding top walls, to abut against opposite sides of the HDD.

4. The fastening device of claim 1, wherein the connection wall comprises a first wall perpendicularly extending down from an end of the top wall, a second wall perpendicularly extending inward from a bottom of the first wall, and a third wall perpendicularly extending down from a side of the second wall away from the first wall to be connected to the corresponding end of the bottom wall.

5. The fastening device of claim 4, wherein the latch is formed on an end surface of the second wall of the corresponding fastening member, extending below the second wall, the positioning portion comprises a positioning tab parallel to the bottom plate, the hooking slot is defined in the positioning tab.

6. The fastening device of claim 5, wherein the positioning portion further comprises an L-shaped fastening tab attached to the bottom plate, the positioning tab extends from a top of the fastening tab.

7. A hard disk drive (HDD) assembly, comprising:
   an HDD;
   a bottom plate, two protrusions protruding up from the bottom plate, a positioning portion formed on the bottom plate, the positioning portion defining a hooking slot; and
   two fastening members each comprising a connection wall, and a top wall and a bottom wall perpendicularly extending from top and bottom sides of the connection wall, the top walls fastened to a bottom of the HDD, each bottom wall defining an engaging hole, the engaging hole comprising a first hole and two small second holes communicating with the first hole at opposite sides of the first hole, the first hole having a larger diameter than those of the second holes, a latch formed on one of the fastening members,
   wherein when the HDD is being fastened, the HDD is slid to allow each protrusion to enter one of the second holes from a corresponding one of the first holes, and to allow the latch to engage in the hooking slot.

8. The HDD assembly of claim 7, wherein each protrusion comprises a neck extending up from the bottom plate and a head formed on a top of the neck, the head has a larger diameter than the neck, the neck engages in the corresponding second hole after entering the second hole, the head abuts against the corresponding bottom wall.

9. The HDD assembly of claim 7, wherein two stopping tabs extend up from the corresponding top walls, to abut against opposite sides of the HDD.

10. The HDD assembly of claim 7, wherein the connection wall comprises a first wall perpendicularly extending down from an end of the top wall, a second wall perpendicularly extending inward from a bottom of the first wall, and a third wall perpendicularly extending down from a side of the second wall away from the first wall to be connected to the corresponding end of the bottom wall.

11. The HDD assembly of claim 10, wherein the latch is formed on an end surface of the second wall of the corresponding fastening member, extending below the second wall, the positioning portion comprises a positioning tab parallel to the bottom plate, the hooking slot is defined in the positioning tab.

12. The HDD assembly of claim 11, wherein the positioning portion further comprises an L-shaped fastening tab attached to the bottom plate, the positioning tab extends from a top of the fastening tab.

* * * * *